W. R. PAIGE.
CUTTING TOOL FOR USE IN LATHES, PLANING MACHINES, AND THE LIKE.
APPLICATION FILED APR. 15, 1920.
1,367,087. Patented Feb. 1, 1921.
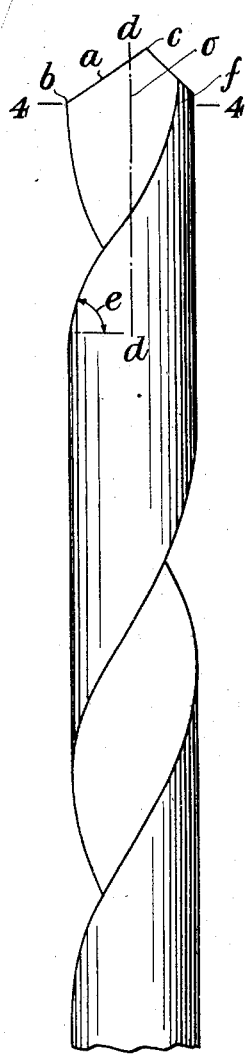
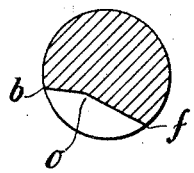
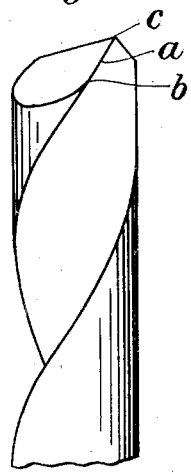
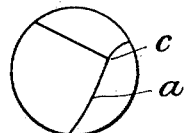
INVENTOR:
William Robert Paige.
By Wm Wallace White
ATTY.

UNITED STATES PATENT OFFICE.

WILLIAM ROBERT PAIGE, OF SHEFFIELD, ENGLAND.

CUTTING-TOOL FOR USE IN LATHES, PLANING-MACHINES, AND THE LIKE.

1,367,087. Specification of Letters Patent. Patented Feb. 1, 1921.

Application filed April 15, 1920. Serial No. 374,131.

*To all whom it may concern:*

Be it known that I, WILLIAM ROBERT PAIGE, of Drill Square, Sheffield, England, a subject of the King of Great Britain and Ireland, have invented certain new and useful Improvements in or Relating to Cutting-Tools for Use in Lathes, Planing-Machines, and the like, of which the following is a specification.

This invention relates to cutting tools for use in lathes, planing machines and the like of the type which is somewhat similar in form to a twist drill, that is to say, a round bar formed with a helical groove so that when the tool is ground at the end it is possible to finish it with the same rake, hook and clearance which it had before grinding without reforging the tool.

A tool made in accordance with this invention is characterized in that the cutting edge of a right handed tool extends from the cylindrical surface on the left, (assuming the tool to be held horizontally with the cutting edge substantially horizontal and the butt end of the tool toward the observer) to the right of the axis of the tool, the pitch angle of the groove being preferably greater than 50°.

In one form of tool made in accordance with this invention the pitch angle of the groove is about 60° the groove as seen in cross section approximating a V-shaped groove whose sides are inclined to one another at about an angle of 162° the bottom of the groove being suitably rounded. One end of the tool may be shaped for a right handed tool and the other end for a left handed tool. The tool is adapted to be held in a suitable holder.

Referring to the drawings filed herewith—

Figure 1 is a plan of a right handed tool made in accordance with this invention, the tool being shown in a position such that the cutting edge is substantially horizontal with a straight lip of the required rake and angle.

Fig. 2 is a part elevation of Fig. 1.

Fig. 3 is an end view looking at the end of the tool.

Fig. 4 is a cross section on line 4—4 Fig. 1 looking in the same direction.

The cutting edge $a$ extends from the cylindrical surface on the left at $b$ to a point $c$ to the right of the axis $d\,d$, the pitch angle $e$ being about 60°. The groove shown in section in Fig. 4 is formed substantially of two straight lines $b$, $o$, $o$, $f$, rounded at $o$.

A tool made in accordance with this invention can be formed with a rake as low as 23° which is suitable for cutting metal whereas in tools of this type as hitherto formed the rake has been considerably steeper.

With a tool made in accordance with this invention ample clearance is provided for the removal of the cutting, which comes off from the work in spirals of large radius.

What I claim and desire to secure by Letters Patent is:—

1. A cutting tool for use in lathes, planing machines and the like, comprising a cylindrical bar formed with a helical groove, the transverse section of the bar representing a figure bounded by an arc and two straight lines inclined to one another at or about an angle of 162° forming said helical groove the bottom of said groove being suitably rounded, the cutting edge of the tool extending from the cylindrical surface of the bar on one side to a point on the other side of the axis of the tool.

2. A cutting tool for use in lathes, planing machines and the like comprising a cylindrical bar formed with a helical groove, the transverse section of the bar representing a figure bounded by an arc and two straight lines inclined to one another at or about an angle of 162° forming said helical groove the bottom of said groove being suitably rounded, the cutting edge of the tool extending from the cylindrical surface of the bar on one side to a point on the other side of the axis of the tool, the pitch angle of the said helical groove being greater than 50°.

3. A cutting tool for use in lathes, planing machines and the like comprising a cylindrical bar formed with a helical groove, the transverse section of the bar representing a figure bounded by an arc and two straight lines inclined to one another at or about an angle of 162° forming said helical groove the bottom of said groove being suitably rounded, the cutting edge of the tool extending from the cylindrical surface of the bar on one side to a point on the other side of the axis of the tool, the pitch angle of the said helical groove being greater than 50°, said groove permitting a top rake having an angle as low as 23°.

In testimony whereof I have signed my name to this specification.

WILLIAM ROBERT PAIGE.